(12) United States Patent
Katoh (10) Patent No.: US 8,462,210 B2
(45) Date of Patent: Jun. 11, 2013

(54) VEHICLE PERIPHERY DISPLAYING APPARATUS

(75) Inventor: Kouji Katoh, Toyoake (JP)

(73) Assignee: DENSO CORPORATION, Kariya (JP)

( * ) Notice: Subject to any disclaimer, the term of this patent is extended or adjusted under 35 U.S.C. 154(b) by 606 days.

(21) Appl. No.: 12/656,249

(22) Filed: Jan. 21, 2010

(65) Prior Publication Data

US 2010/0201817 A1 Aug. 12, 2010

(30) Foreign Application Priority Data

Jan. 22, 2009 (JP) .................................. 2009-11906

(51) Int. Cl.
*H04N 7/18* (2006.01)
(52) U.S. Cl.
USPC ............ 348/148; 340/435; 340/436; 382/283
(58) Field of Classification Search
None
See application file for complete search history.

(56) References Cited

U.S. PATENT DOCUMENTS

| | | | | |
|---|---|---|---|---|
| 6,498,620 | B2* | 12/2002 | Schofield et al. | 348/148 |
| 6,693,518 | B2* | 2/2004 | Kumata et al. | 340/435 |
| 6,738,073 | B2* | 5/2004 | Park et al. | 345/629 |
| 7,069,128 | B2* | 6/2006 | Iwama | 701/36 |
| 7,505,047 | B2 | 3/2009 | Yoshimura | |
| 7,697,055 | B2* | 4/2010 | Imoto et al. | 348/335 |
| 8,085,140 | B2* | 12/2011 | Mochizuki et al. | 340/438 |
| 8,115,810 | B2* | 2/2012 | Yoneji | 348/148 |
| 8,130,270 | B2* | 3/2012 | Ito et al. | 348/148 |
| 2002/0080017 | A1 | 6/2002 | Kumata et al. | |
| 2005/0174429 | A1* | 8/2005 | Yanai | 348/148 |
| 2006/0126897 | A1* | 6/2006 | Nagaoka et al. | 382/103 |
| 2006/0187238 | A1 | 8/2006 | Yoneji | |
| 2008/0055407 | A1* | 3/2008 | Abe | 348/118 |
| 2008/0246843 | A1* | 10/2008 | Nagata et al. | 348/148 |
| 2009/0066842 | A1 | 3/2009 | Hattori et al. | |
| 2010/0165104 | A1* | 7/2010 | Fujita et al. | 348/148 |

FOREIGN PATENT DOCUMENTS

| | | |
|---|---|---|
| EP | 2 150 054 A1 | 2/2010 |
| JP | A-2004-64131 | 2/2004 |
| JP | A-2005-112267 | 4/2005 |
| JP | 2006-157634 | 6/2006 |
| JP | A-2008-4990 | 1/2008 |

OTHER PUBLICATIONS

Office Action mailed on May 31, 2011 from the Japanese Patent Office in the corresponding Patent Application No. 2009-011906 (English translation enclosed).
Office Action mailed Feb. 15, 2011 issued in corresponding JP patent application No. 2009-011906 (English translation enclosed).

* cited by examiner

*Primary Examiner* — Greg C Bengzon
(74) *Attorney, Agent, or Firm* — Posz Law Group, PLC

(57) ABSTRACT

A vehicle periphery displaying apparatus including an imaging device, a display device and a display controller is disclosed. The imaging device is configured to capture a vehicle periphery image with a wide horizontal filed of view. The display device includes a display screen, a dimension of the display screen in a vertical direction being larger than that in a horizontal direction. The display controller is configured to produce a predetermined-part image so that a part of the vehicle periphery image corresponds to the predetermined-part image. The display controller is further configured to cause the display device to display the vehicle periphery image and the predetermined-part image on the display screen such that the vehicle periphery image and the predetermined-part image are arranged one above the other in the vertical direction.

17 Claims, 9 Drawing Sheets

VEHICLE PERIPHERY DISPLAYING APPARATUS

CROSS REFERENCE TO RELATED APPLICATION

The present application is based on Japanese Patent Application No. 2009-11906 filed on Jan. 22, 2009, disclosure of which is incorporated herein by reference.

BACKGROUND OF THE INVENTION

1. Field of the Invention

The present invention relates to a vehicle periphery displaying apparatus for capturing and displaying an image of a periphery of a vehicle.

2. Description of Related Art

A typical vehicle periphery displaying apparatus captures an image showing a vehicle periphery situation and displays the captured image on a display device equipped in a vehicle compartment, in order to assist a vehicle driver. For example, JP-2006-262447A corresponding to US-2006/0187238A discloses that a wide angle camera having a wide angle of view in a horizontal direction captures an image of a vehicle periphery, and a display device displays the captured image on a screen located at a center part of a dashboard in a vehicle compartment. As is the case for JP-2006-262447A corresponding to US-2006/0187238A, a display device of a typical vehicle periphery displaying apparatus has a long dimension in the horizontal direction and is located at a center part of a dashboard.

The inventor of the present application has studied the following technique for a more safety driver assistance. A vehicle periphery image is not displayed on a display device arranged at a center part of a dashboard but displayed on a display screen arranged right before a driver seat. For example, a vehicle periphery image is displayed on a display screen arranged in an instrument panel. This arrangement of a display screen can reduce movement of viewpoint of a driver and can assist the driver in more safety and reliable manner.

The display screen arranged on an instrument panel may become smaller than a screen of the display device arranged at the center part of a dashboard, because an instrument panel needs to display thereon a variety of information, e.g., a speed indicator, an engine revolution indicator, a remaining gasoline amount indicator and the like. When sizes of and an arrangement of the speed indicator, the engine revolution indicator and the like are took into account, it may be preferable that the display screen on the instrument panel have a vertically-long-rectangular shape, and have a longer dimension in the vertical direction than that in the horizontal direction. When a wide angle camera having a wide horizontal angle of view captures an image and when a display screen having a vertically-long-rectangular shape displays the captured image, the displayed image may become poorly viewable because of narrowing the image in the horizontal direction. This is because the image for display has a horizontally-long-rectangular shape whereas the display screen for displaying the image has a vertically-long rectangular shape.

SUMMARY OF THE INVENTION

In view of the above and other points, it is an objective of the present invention to provide a vehicle periphery displaying apparatus that is capable of displaying an image in an easily viewable manner for a user even when a horizontally long image is displayed on a vertically long display screen, which has a dimension in a vertical direction larger than that in a horizontal direction.

According to an aspect of the present invention, a vehicle periphery displaying apparatus is provided. The vehicle periphery displaying apparatus includes: an imaging device, a display device and a display controller. The imaging device is configured to capture a vehicle periphery image with a wide horizontal filed of view. The display device includes a display screen, a dimension of the display screen in a vertical direction being larger than that in a horizontal direction. The display controller is configured to produce a predetermined-part image so that a part of the vehicle periphery image corresponds to the predetermined-part image. The display controller is further configured to cause the display device to display the vehicle periphery image and the predetermined-part image on the display screen such that the vehicle periphery image and the predetermined-part image are arranged one above the other in the vertical direction.

According to the above vehicle periphery displaying apparatus, even when a horizontally long image is displayed on a vertically long display screen, a vehicle periphery image and a part of the vehicle periphery image can be displayed one above the other on the display screen. Thus, a user can visually recognize not only a vehicle periphery as a whole but also a part of the vehicle periphery, the part being displayed with a large scale. Therefore, it is possible to provide an image of a vehicle periphery in an easily-viewable manner for a user.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXEMPLARY EMBODIMENTS

The exemplary embodiments are described below with reference to the accompanying drawings. As one embodiment, a back monitor system for imaging a rear of a vehicle is described below.

Figure 1:
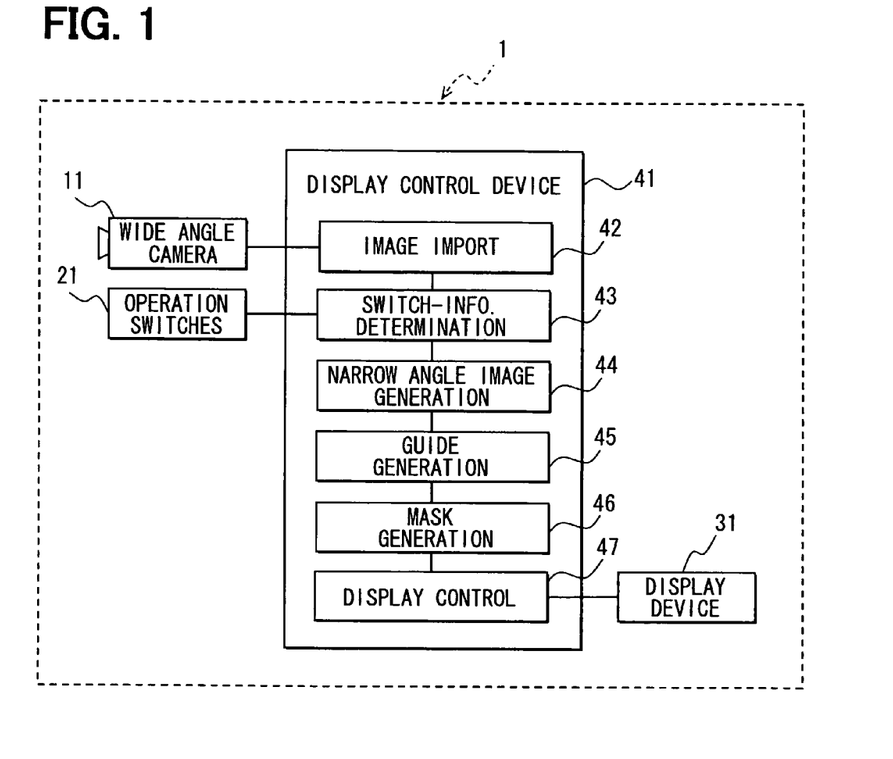
FIG. 1 is a block diagram illustrating a back monitor system according to one embodiment.

FIG. 1 is a block diagram illustrating a back monitor system 1 according to one embodiment.

The back monitor system 1 includes a wide angle camera 11 mounted to a rear part of a vehicle, a group of operation switches 21 mounted to a steering wheel or the like to receive various instructions from a user, a display device 31 for displaying an image captured by the wide angle camera 11, and a display control device 41 for outputting an image signal to the display device 31 and for causing the display device 31 to display the image.

The wide angle camera 11 includes an image sensor, which may be a charged coupled device (CCD). The wide angle camera 11 has a wider angle of view in a horizontal direction than that in a vertical direction. Typically, in order to image a vehicle periphery situation so as to cover a driver's blind spot on, for example, a rear side of the vehicle, a camera may need to have an horizontal angle of view wider than a vertical angle of view. The wide angle camera 11 is mounted to the rear part of the vehicle and captures an image of a vehicle periphery that continuously extending rightward and leftward from the rear of the vehicle.

The group of operation switches 21 may include button switches that are arranged around the steering wheel to provide high accessibility to a user. The group of operation switches 21 may include a touch panel integrated with the display device 31, so that touch-sensitive switches are provided on a display screen of the display device 31. In this case, the touch panel and the display screen 32 may be laminated and integrated. The touch panel may be a pressure sensitive type, an electromagnetic induction type, a capacitive type, a combination of the forgoing types, and the like. The group of operation switches 21 may include a microphone (not shown) for receiving user voice and a voice recognition unit for voice recognition. A result of the voice recognition may serve as an output of the group of operation switches 21.

Figure 2:
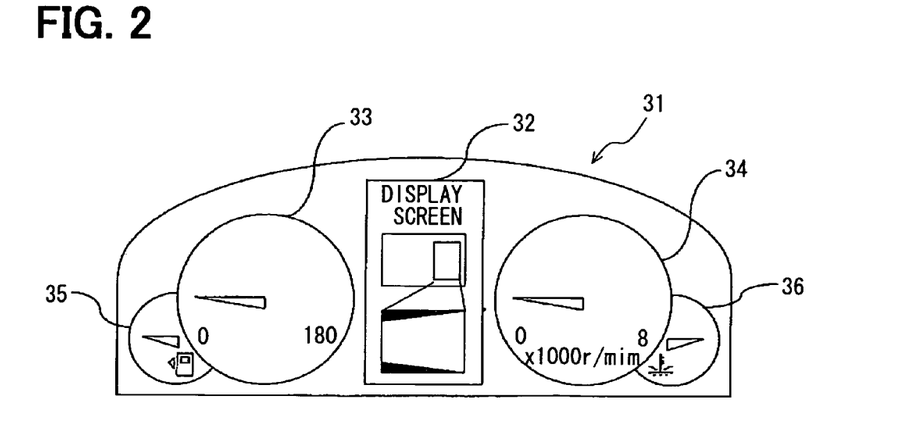
FIG. 2 is a diagram illustrating an instrument panel including a display screen according to one embodiment.

As shown in FIG. 2, the display device 31 can be configured as an instrument panel. The display device 31 includes a display part for displaying a vehicle periphery image. Because the instrumental panel presents a variety of information including, for example, a speed indicator 33, an engine revolution indicator 34, a remaining fuel amount indicator 35, an engine coolant temperature indicator 36 and the like, the display part for displaying a vehicle periphery image may be configured as a display screen 32 having a larger dimension in the vertical direction than that in the horizontal direction. The display screen 32 may be a liquid crystal display screen, a plasma display screen, a cathode ray tube (CRT) screen or the like. The display screen 32 for displaying a vehicle periphery image may also act as a display screen for displaying a variety of vehicle information and/or for displaying a map and route guidance information for use in a navigation system. Alternatively, the generally all of the instrument panel may be configured as a display screen 32, and a part of the instrument panel may act as the display part for displaying a vehicle periphery image.

The display control device 41 includes a microcomputer as a main component. The micro computer includes a CPU, a ROM, a RAM, an I/O and a bus line connecting the foregoing components. The display control device 41 can act an electronic apparatus that performs processing on image data. The display control device 41 may be standalone with respect to the wide angle camera 11. Alternatively, the display control device 41 may be integrated with the wide angle camera 11.

The wide angle camera 11 can act as an imaging device or imaging means. The display control device 41 can act as a display controller or display control means.

Figure 3:
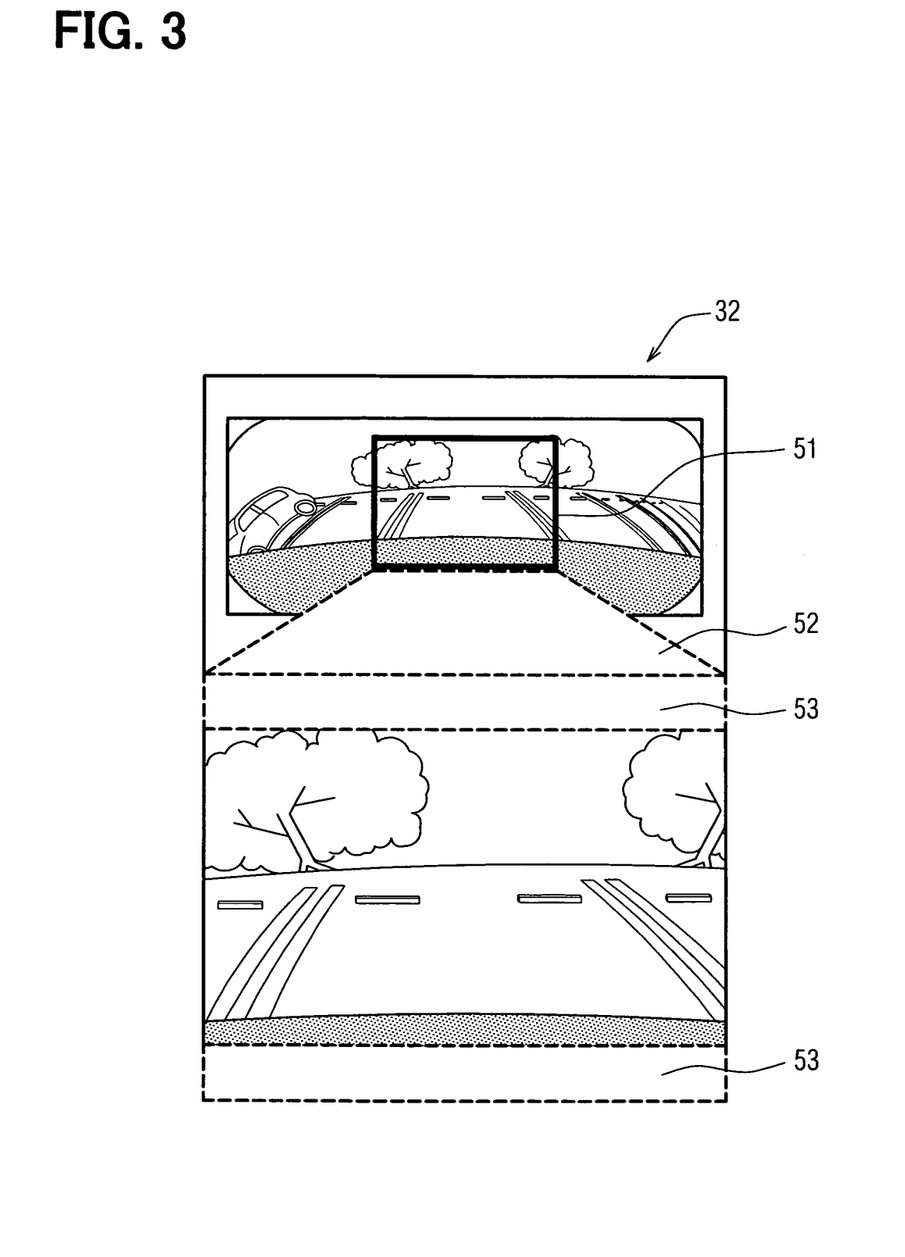
FIG. 3 is a diagram illustrating one exemplary display on a display screen according to one embodiment.
Figure 4A:
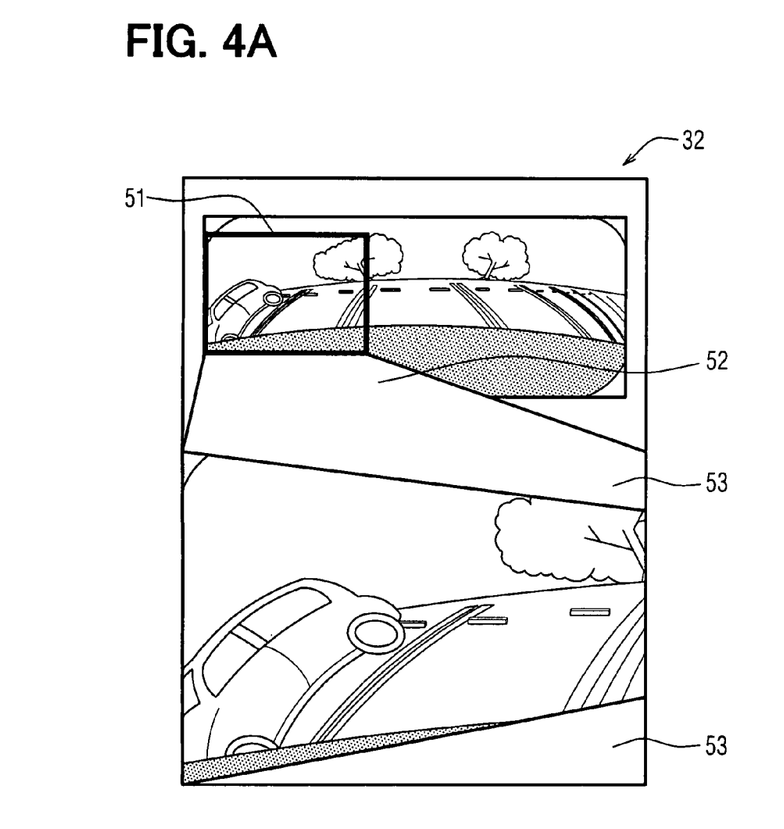
FIG. 4A is a diagram illustrating a vehicle periphery image and a left-side part image on a display screen according to one embodiment.
Figure 4B:
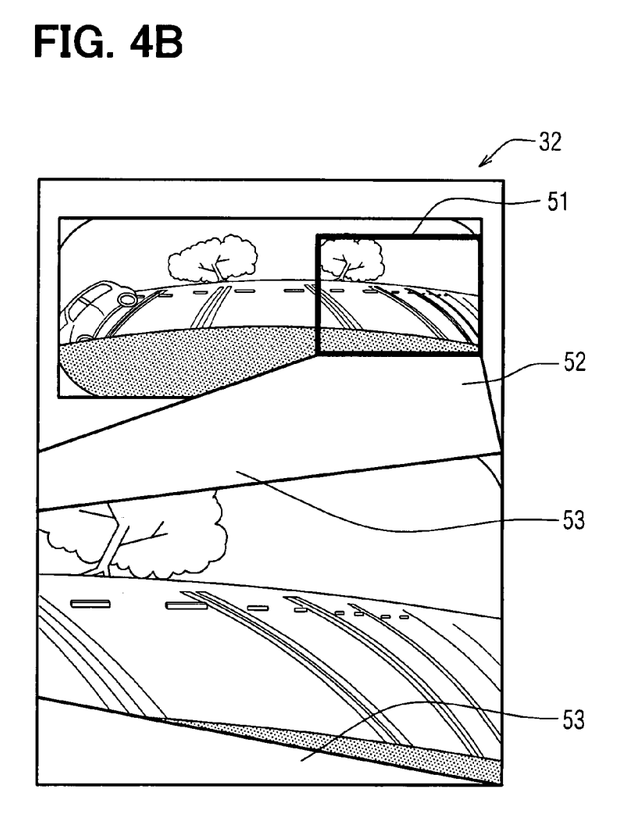
FIG. 4B is a diagram illustrating a vehicle periphery image and a right-side part image on a display screen according to one embodiment.

A display process performed by the display control device 41 is described below with reference to FIGS. 1, 3 and 4. FIGS. 3, 4A and 4B illustrate examples of display on the display part. As shown in FIG. 3, the display control device 41 reduces the generally whole size of a vehicle periphery image captured by the wide angle camera 11, and displays the vehicle periphery image on an upper region of the display part. Further, the display control device 41 produces a predetermined-part image. The predetermined-part image corresponds to a part of the vehicle periphery image and thus can correspond to the part that a user would like to visually recognize in a detailed manner in the vehicle periphery image. The display control device 41 displays the predetermined-part image on a lower region of the display part so that the predetermined-part image has a larger scale than the vehicle periphery image. The predetermined-part image may be also referred to hereinafter as a narrow angle image. To perform the above display process, the display control device 41 includes an image import section 42, a switch information determination section 43, a narrow angle image generation section 44, a guide generation section 45 and a mask generation section 46 and an image display control section 47. In the followings, a function of each section will be more specifically described.

The image import section 42 imports a vehicle periphery image captured by the wide angle camera 11. The imported vehicle periphery image is a horizontally-long image, which has a long dimension in the horizontal direction. In importing the vehicle periphery image, the image import section 42 may make the vehicle periphery image further horizontally-longer by cutting the vehicle periphery image into a horizontally-long-rectangular-shaped image or compressing the vehicle periphery image in the vertical direction or the like. Alternatively, if a vehicle periphery image is captured by a camera having a horizontal angle of view and a vertical angle of view substantially equal to each other, or a camera having a vertical angle of view larger than a horizontal angle of view, the image import section 42 may import the vehicle periphery image as a horizontally-long-shaped image by cutting the vehicle periphery image into a horizontally-long rectangular shaped image or compressing the vehicle periphery image in the vertical direction or the like.

The switch information determination section 43 determines input information associated with a user operation of the group of operation switches 21. By using the group of operation switches 21, a user can specify a part that a user would like to visually recognize in a detailed manner in the vehicle periphery image imported by the image import section 42. More specifically, as shown in FIG. 3, a narrow angle image indicator frame 51 is displayed on a vehicle periphery image so that the narrow angle image indicator frame 51 is movable to a center part, a right-side part and a left-side part of the vehicle periphery image in response to an input from a user. For simplicity, the narrow angle image indicator frame 51 is also referred to hereinafter as a frame 51. The frame 51 on the vehicle periphery image highlights the part that a user would like to visually recognize in a detailed manner in the vehicle periphery image. In the above, the frame 51 is movable to a center part, a right-side part and a left-ride part of the vehicle periphery image. Alternatively, the frame 51 may be smoothly movable upward, downward, leftward and rightward. Further, the size of the frame 51 may be settable to arbitrarily size by a user.

Based on the input information determined by the switch information determination section 43, the narrow angle image generation section 44 produces a narrow angle image through: determining the part that a user would like to visually recognize in a detailed manner in the vehicle periphery image; cutting out the part from the vehicle periphery image; and adjusting size or scale of the part so that the adjusted part can be displayed on the bottom part of the display screen 32. For example, when a user operates a "right key" of the group of operation switches 21, the frame 51 moves to and surrounds the right-side part of the vehicle periphery image. Then, the narrow angle image generation section 44 produces a narrow angle image through adjusting the size or scale of an image corresponding to the right-side part of the vehicle periphery image so that the adjusted image can be displayed on the bottom part of the display screen 32.

A guide generation section 45 produces a guide image 52 exemplified in FIG. 3. The guide image 52 is displayed so that a dimension of the guide image 52 in the horizontal direction widens from a lower edge of the frame 51 toward an upper edge of the narrow angle image displayed on the bottom part of the display screen 32. The guide image 52 may be translucent. Alternatively, the guide image 52 may have only a boundary frame.

The mask generation section 46 produces a mask image 53, which is illustrated in FIG. 3 for instance. The mask image 53 is deformed depending on location of the frame 51 in the vehicle periphery image. For example, when the frame 51 is located on the left-side part of the vehicle periphery image as is illustrated in FIG. 4A, the mask image 53 is displayed so that a dimension of the displayed narrow angle image in the vertical direction decreases from a left edge toward a right edge of the narrow angle image. When the frame 51 is located on the right-side part of the vehicle periphery image as is illustrated in FIG. 4B, the mask image 53 is displayed so that a dimension of the displayed narrow angle image in the vertical direction decreases from the right edge to the left edge of the narrow angle image. It becomes thereby possible to utilize a visual effect. For example, when a user see an image whose dimension in the vertical direction decreases from a right edge to a left edge of the image, the user can easily notify that the image is on a right-hand side of himself or herself.

The image display control section 47 controls an image that is to be displayed on the display screen 32 of the display device 31. The image display control section 47 causes the display device 31 to display the narrow angle image on the bottom region of the display screen 32, the narrow angle image being produced by the narrow angle image generation section 44. The image display control section 47 reduces the size or scale of the vehicle periphery image imported by the image import section 42 and causes the display device 31 to display the reduced vehicle periphery image on the upper part of the display screen. Then, the image display control section 47 causes the display device 31 to display the guide image 52, which is produced by the guide generation section 45, on the display screen 32. Further, the image display control section 47 causes the display device 31 to display the mask image 53, which is produced by the mask generation section 46, on the display screen 32.

The image display process performed by the display control device 41 is described below with reference to flowcharts illustrated in FIGS. 5 to 8. The image display process is performed based on programs stored in the display control device 41.

Figure 5:
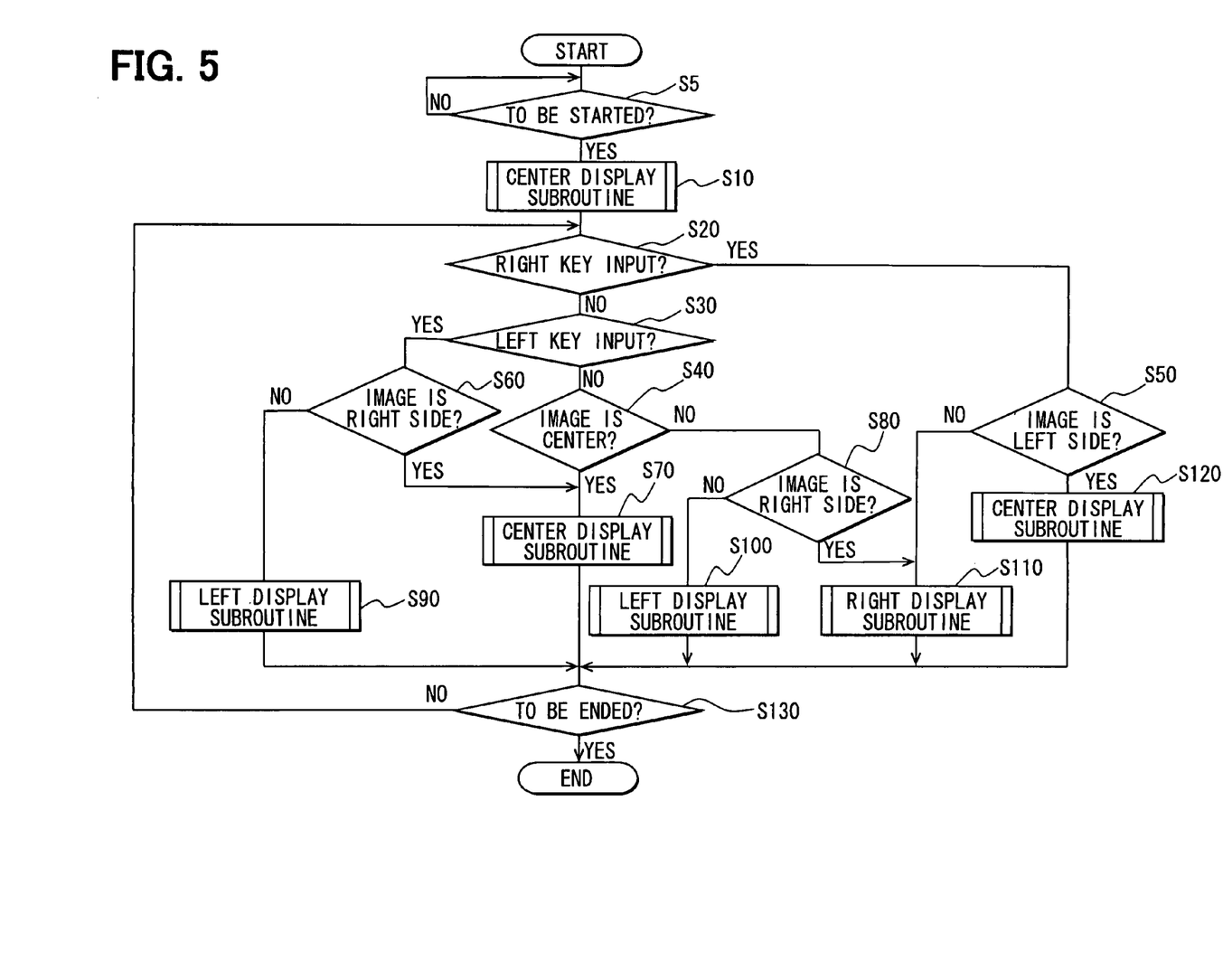
FIG. 5 is a flowchart illustrating an image display process according to one embodiment.

At S5, it is determined whether a driver assistance using the back monitor system 1 is to be started. For example, when a vehicle travels rearward for parking, or when a gear shifter is positioned at "R (reverse)" in vehicle start, it is determined that a driver assistance using the back monitor system 1 is to be started. In such a case, the determination "YES" is made at S5 and the process proceeds to S10. When it is determined that a driver assistance using the back monitor system 1 is not to be started, the determination "NO" is made at S5, and S5 is repeatedly performed until it is determined that the driver assistance using the back monitor system 1 is to be started.

At S10, a center narrow angle display subroutine (referred to also as a center display subroutine for simplicity) is executed. Details of the center display subroutine will be described later. After S10, the process proceeds to S20.

At S20, it is determined whether a "right key" of the group of operation switches 21 is operated by a user. The "right key" may be operated when the user would like to display the right of the part of the vehicle periphery image as the narrow angle image, the part corresponding to the presently-displayed narrow angle image. When it is determined that the "right key" of is not operated, corresponding to "NO" at S20, the process proceeds to S30. When it is determined that the "right key" is operated, corresponding to "YES" at S20, the process proceeds to S50.

At S30, it is determined whether a "left key" of the group of operation switches 21 is operated. The "left key" may be operated when the user would like to display the left of the part of the vehicle periphery image as the narrow angle image, the part corresponding to the presently-displayed narrow angle image. When it is determined that the "left key" is not operated, corresponding to "NO" at S30, the process proceeds to S40. When it is determined that the "left key" is operated, corresponding to "YES" at S30, the process proceeds to S60.

At S40, it is determined whether the presently-displayed narrow angle image corresponds to a center part of the vehicle periphery image. When a narrow angle image flag is set to "center", the determination "YES" is made at S40, and the process proceeds to S70 where the center display subroutine is performed. When the narrow angle image flag is not set to "center", the determination "NO" is made at S40, and the process proceeds to S80. In the above, the narrow angle image flag can act as an indicator that indicates which part of the vehicle periphery image corresponds to the narrow angle image.

At S50, it is determined whether the presently-displayed narrow angle image corresponds to a left-side part of the vehicle periphery image. When the narrow angle image flag is set to "left-side", the determination "YES" is made at S50, and the frame 51 is move to the center part of the vehicle periphery image, and the process proceeds to S120. At S120, the center display subroutine is performed. After S120, the process proceeds to S130. When it is determined at S50 that the narrow angle image flag is not set to "left-side", the determination "NO" is made at S50. In this case, since it is possible to determine that the narrow angle image flag is set to "center" or "right-side", the frame 51 is moved to the right-side part based on the "right key" input determined at S20. At S110, a right side narrow angle display subroutine (referred to also as a right display subroutine for simplicity) is performed. After S110, the process proceeds to S130. Details of the right display subroutine will be described later.

At S60, it is determined whether the presently-displayed narrow angle image corresponds to a right-side part of the vehicle periphery image. When the narrow angle image flag is set to "right-side", the determination "YES" is made at S60, and the frame 51 is move to the center part, and the process proceeds to S70. At S70, the center display subroutine is performed. After S70, the process proceeds to S130. When the narrow angle image flag is not set to "right-side", the determination "NO" is made at S60. In this case, since it is possible to determine that the narrow angle image flag is set to the "center" or the "left side", the frame 51 is moved to the left-side part of the vehicle periphery image based on the "left key" input determined at S30. At S90, a left side narrow angle display subroutine (referred to also as a left display subroutine for simplicity) is performed. After S90, the process proceeds to S130. Details of the left display subroutine will be described later.

S80 is similar to S60. More specifically, at S80, it is determined whether the presently-displayed narrow angle image corresponds to the right-side part of the vehicle periphery image. When the narrow angle image flag is set to "right-side", the determination "YES" is made at S80, the process proceeds to S110 where the right display subroutine is performed. After S110, the process proceeds to S130. When the narrow angle image flag is not set to "right-side", the determination "NO" is made at S80, and the process proceeds to S100 where the left display subroutine is performed. After S100, the process proceeds to S130.

At S130, it is determined whether the driver assistance using the back monitor system 1 is to be ended. For example, when a user changes position of the gear shifter from "R" into "P" or "D" for instance, it is determined that the driver assistance using the back monitor system 1 is to be ended, corresponding to "YES" at S130. When it is determined that the driver assistance using the back monitor system 1 is to be continued, corresponding to "NO" at S130, the process returns to S20.

Figure 6:
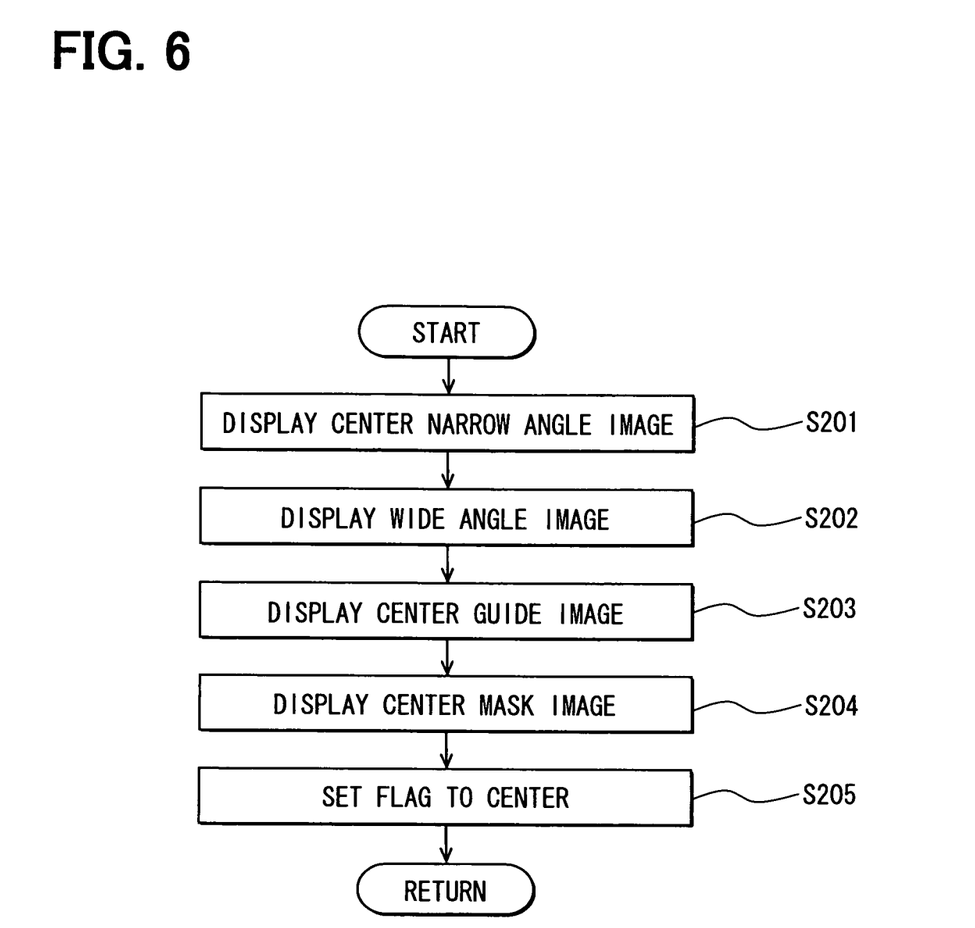
FIG. 6 is a flowchart illustrating a center display subroutine.

The center display subroutine performed at S10, S70 and S120 is described below with reference to a flowchart illustrated in FIG. 6.

At S201, the lower region of the display screen 32 displays the narrow angle image that is produced by the narrow angle image generation section 44 so as to correspond to the center part of the vehicle periphery image. At S202, the size or scale of the vehicle periphery image is adjusted so that the generally whole of the vehicle periphery image can be displayed. Further, the adjusted vehicle periphery image is displayed on the upper region of the display screen 32.

At S203, the guide image 52 produced by the guide generation section 45 is displayed on the display screen 32. At S204, the mask image 53 produced by the mask generation section 46 is displayed on the display screen 32.

At S205, the narrow angle image flag is set to "center".

Figure 7:
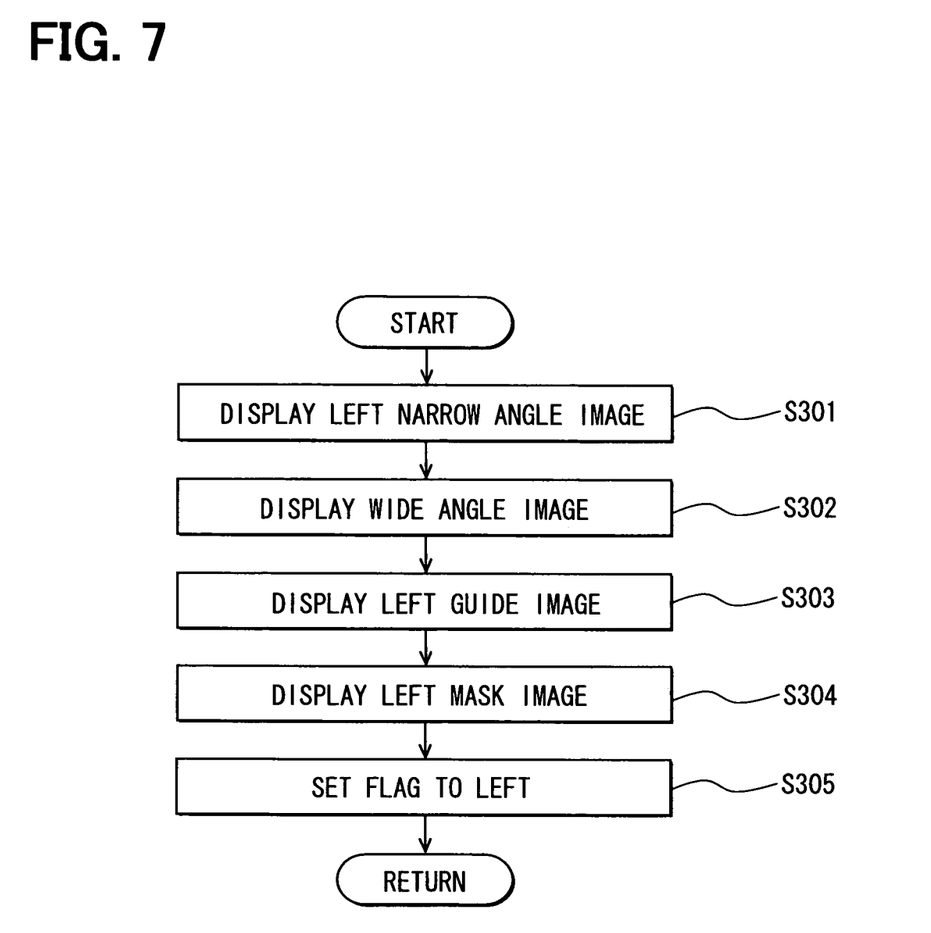
FIG. 7 is a flowchart illustrating a left-side display subroutine.

The left display subroutine performed at S90 and S100 is described below with reference to a flowchart illustrated in FIG. 7.

At S301, the lower region of the display screen 32 displays the narrow angle image that is produced by the narrow angle image generation section 44 so as to correspond to the left side part of the vehicle periphery image. At S302, the size or scale of the vehicle periphery image is adjusted so that the generally whole of the vehicle periphery image can be displayed. Further, the adjusted vehicle periphery image is displayed on the upper region of the display screen 32.

At S303, the guide image 52 produced by the guide generation section 45 is displayed on the display screen 32. At S304, the mask image 53 produced by the mask generation section 46 is displayed on the display screen 32.

At S305, the narrow angle image flag is set to "left side".

Figure 8:
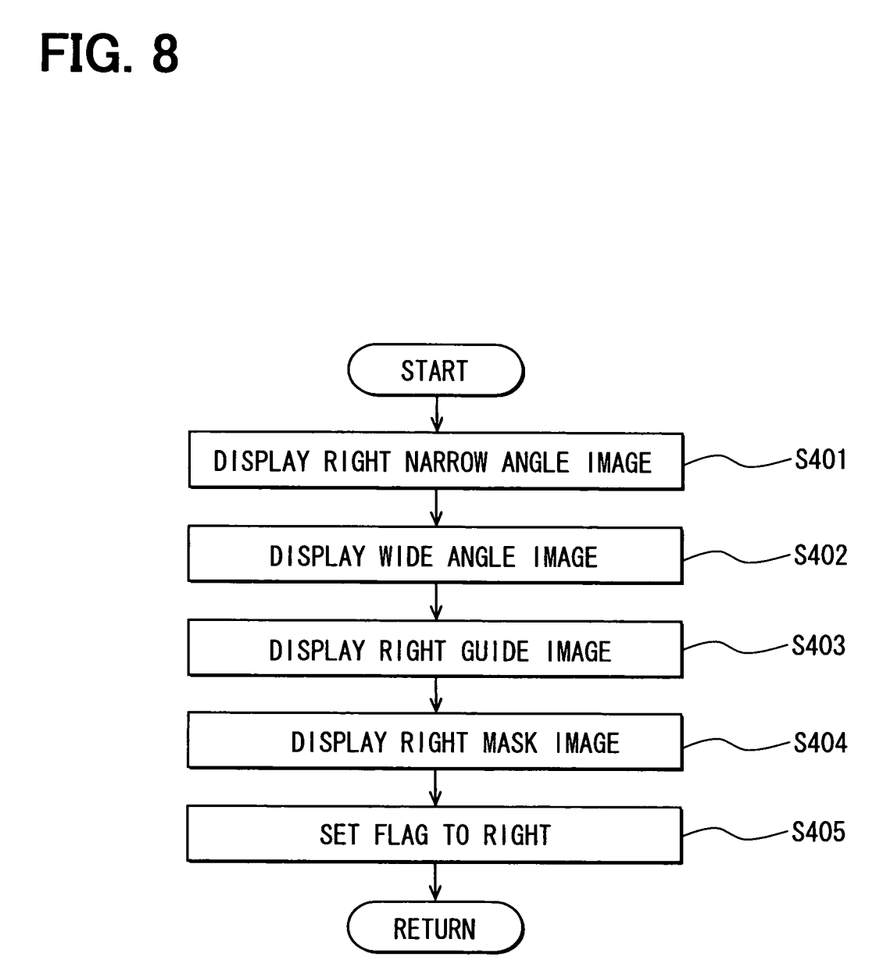
FIG. 8 is a flowchart illustrating a right-side display subroutine.

The right display subroutine performed at S110 is described below with reference to a flowchart illustrated in FIG. 8.

At S401, the lower region of the display screen 32 displays the narrow angle image that is produced by the narrow angle image generation section 44 so as to correspond to the right-side part of the vehicle periphery image. At S402, the size or scale of the vehicle periphery image is adjusted so that the generally whole of the vehicle periphery image can be displayed. The adjusted vehicle periphery image is displayed on the upper region of the display screen 32.

At S403, the guide image 52 produced by the guide generation section 45 is displayed on the display screen 32. At S404, the mask image 53 produced by the mask generation section 46 is displayed on the display screen 32:

At S405, the narrow angle image flag is set to "right side".

In the above embodiment, a vehicle periphery image is captured by the wide angle camera 11 having a wide angle of view in the horizontal direction. A narrow angle image is produced so as to correspond to a part that a user would like to visually recognize in a detailed manner in the vehicle periphery image. Further, the generally whole of the vehicle periphery image and the narrow angle image are displayed on the display screen 32, such that the vehicle periphery image and the narrow angle image are different from each other in scale and are arranged one above the other in the display screen 32. Because of the above manners, even when a vehicle periphery image captured by the wide angle camera 11 is displayed on the vertically-long-shaped display screen 32 arranged in the instrument panel, it is possible to display the vehicle periphery image in an easily viewable manner for a user.

In the above embodiment, a part that a user would like to visually recognize in a detailed manner is highlighted in the vehicle periphery image. For example, the par may be highlighted in the vehicle periphery image such that the part may be surrounded by a frame. 51, or alternatively, display color of the part may be changed. Thus, a user can easily recognize which part of the vehicle periphery image corresponds to the narrow angle image displayed on the lower region of the display screen 32.

In the above embodiment, since a part that a user would like to visually recognize in a detailed manner in the vehicle periphery image is set to the right-side part, the center part or the left-side part of the vehicle periphery image. Thus, it is possible to simplify a user operation for selecting the part that a user would like to visually recognize in a detailed manner in the vehicle periphery image.

In the above embodiment, the guide image 52 is displayed so that the shape of the guide image 52 widens from the frame 51 toward the narrow angle image. Thus, a user can catch at a glance that the narrow angle image, which can correspond to user's interest, is being displayed on the lower region of the display screen 32.

In the above embodiment, when the frame 51 is located on the left-side part of the vehicle periphery image, the mask image 53 is displayed on the display screen 32 so that a dimension of the masked narrow angle image in the vertical direction decreases from the left edge of the narrow angle image toward the right edge of the narrow angle image. When the frame 51 is located on the right-side part of the vehicle periphery image, the mask image 53 is displayed on the display screen 32 so that a dimension of the masked narrow angle image in the vertical direction decreases from the right edge of the narrow angle image toward the left edge of the narrow angle image. According to the above configuration, a user can easily catch in which direction the user sees a vehicle periphery via the displayed narrow angle image.

The above embodiment can be modified in various ways, examples of which are described below.

(First Modification)

A first modification is described below with reference to FIGS. 9A to 9C. In the first modification, when producing the narrow angle image, the narrow angle image generation section 44 performs image processing to correct distortion of the narrow angle image, thereby producing the corrected narrow angle image. Planner mapping or the like may be used for the image processing to correct image distortion.

Figure 9A:
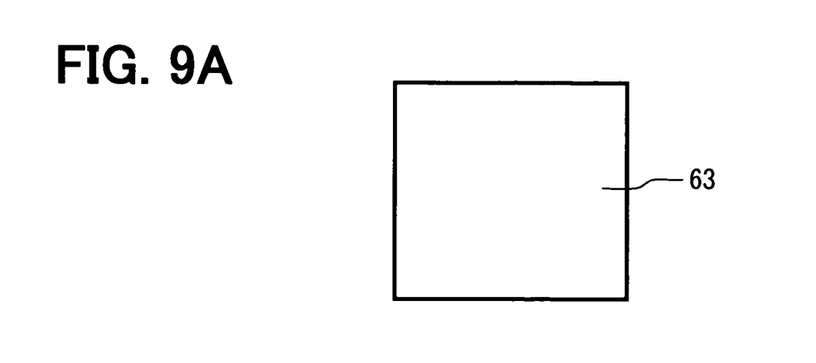
FIG. 9A is a diagram illustrating one exemplary image before image processing.
Figure 9B:
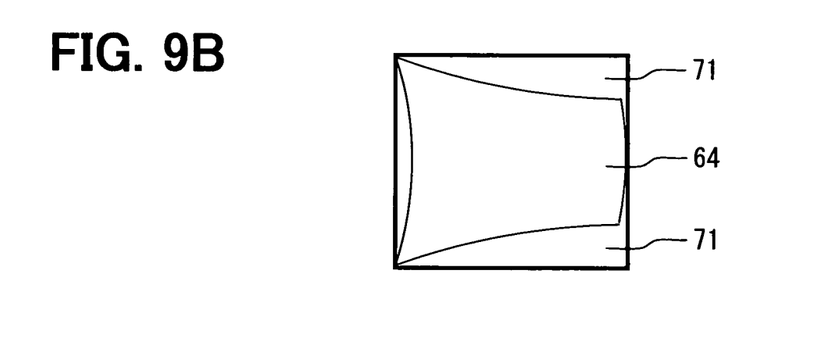
FIG. 9B is a diagram illustrating one exemplary image after the image processing.
Figure 9C:
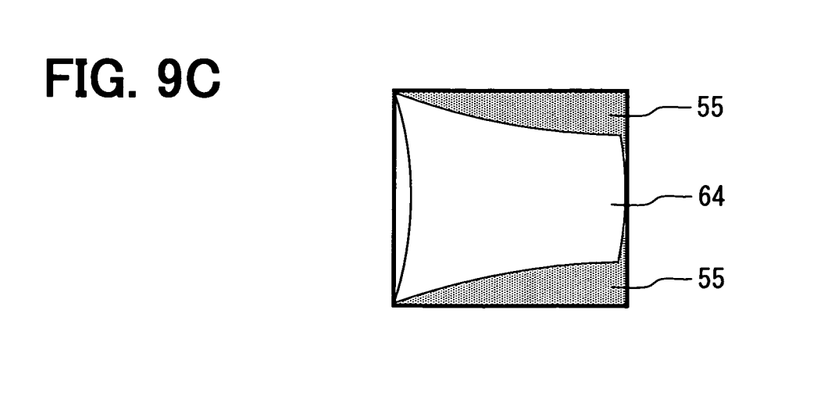
FIG. 9C is a diagram illustrating one exemplary image after the image processing and masking.

FIG. 9A illustrates a case where: the frame 51 is located on the left side part of the vehicle periphery image; a narrow angle image 63 on which the image processing is not performed is displayed on the lower region of the display screen 32; and the narrow angle image is not masked. As shown in FIG. 9B, when the image processing to correct image distortion is performed, the narrow angle image 63 is changed into a narrow angle image 64 having a deformed outline, and thus, an area 71 where an image is absent appears in the lower region of the display screen 32. In such a case, as shown in FIG. 9C, the mask generation section 46 may produce a modified mask image 55, which has a shape corresponding to the area 71, and the modified mask image 55 is displayed.

In the first modification, a vehicle periphery image captured by the wide angle camera 11 is corrected by image processing, and thereby, a corrected narrow angle image is produced. It is therefore possible to provide a distortion-corrected and easily-viewable image. Further, the loss of image information due to the mask image can be reduced, because the modified mask image 55 with a shape corresponding to the distortion-corrected narrow angle image is displayed on the distortion-corrected narrow angle image.

(Second Modification)

Figure 10A:
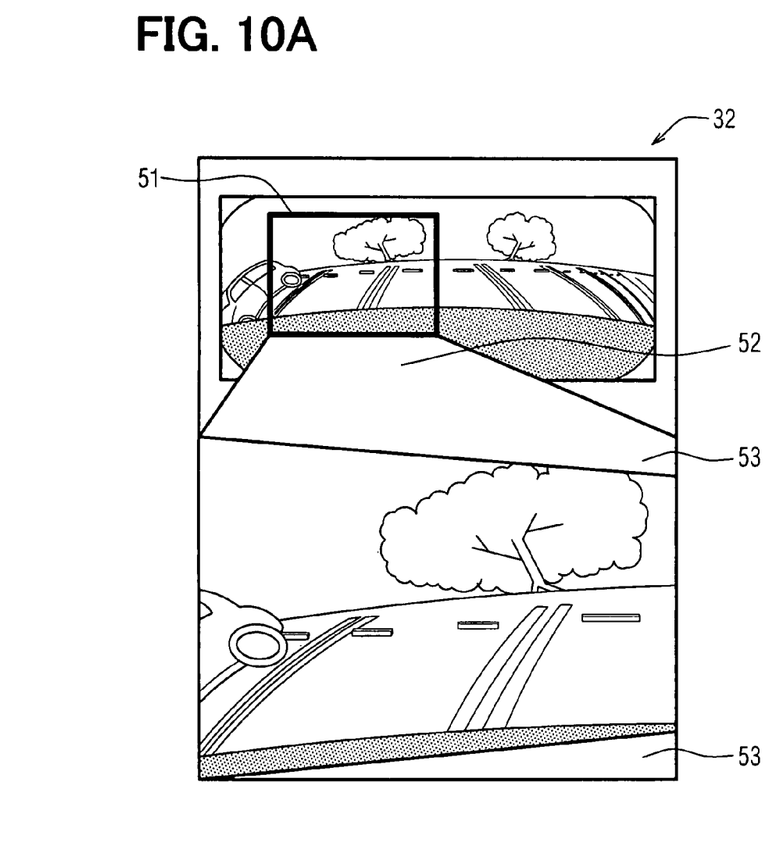
FIGS. 10A and 10B are diagrams illustrating one exemplary display on a display screen according to a modified embodiment.
Figure 10B:
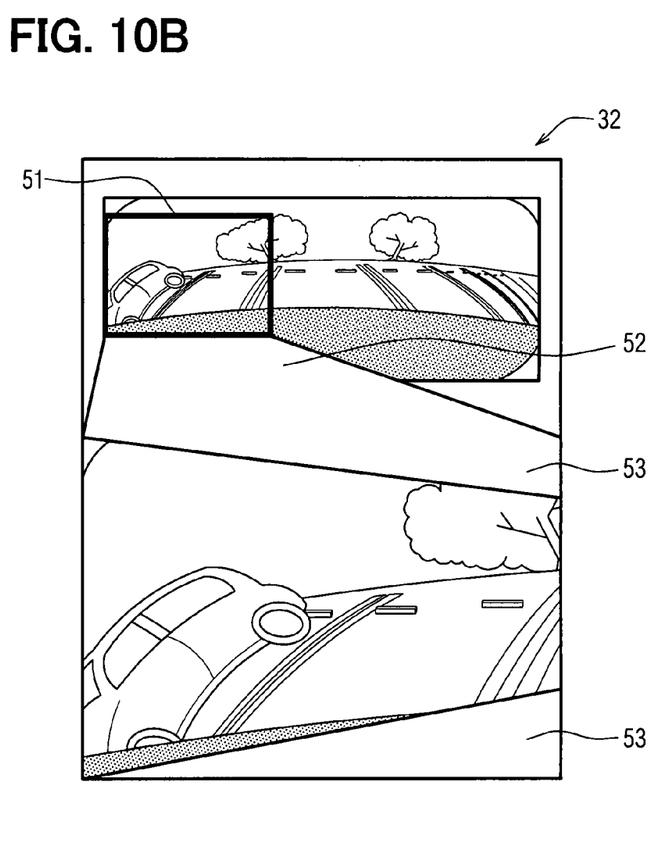

A second modification is described below with reference to FIGS. 10A and 10B. The frame 51 in the second modification is smoothly movable leftward and rightward etc., whereas the frame 51 in the above embodiment is movable to three parts of a right side part, a center part and a left side part of a vehicle periphery image. In the second modification, the shape of the mask image 53 may be changed in accordance with location of the frame 51. For example, as shown in FIGS. 10A and 10B, the shape of the mask image 53 is smoothly changed such that, as the frame 51 is moved leftward in the vehicle periphery image, the right edge of the narrow angle image becomes shorter so that the visual effect becomes more notable. Further, the shape of the mask image 53 is smoothly changed such that, as the frame 51 is moved rightward in the vehicle periphery image, the left edge of the narrow angle image becomes shorter so that the visual effect becomes more notable. The frame 51 may be movable not only leftward and rightward but also upward, downward and in a diagonal direction.

According to the second modification, it is possible to provide a high degree of freedom for setting the part that a user would like to visually recognize in detail. Further, since the shape of the mask image 53 is changeable in accordance with location of the frame 51, a user can easily catch the location of the part of the vehicle periphery image through the shape of the mask image 53.

(Other Modifications)

In the above embodiment, a narrow angle image is produced by the narrow angle image generation section 44 and displayed on the lower region of the display screen 32. Then, a vehicle periphery image imported by the image import section 42 is downsized or downscaled as a whole, and displayed on an upper region of the display screen 32. Alternatively, a vehicle periphery image may be imported by the image import section 42, may be adjusted in scale or size and may be displayed on an upper region of the display screen 32. Then, a part of the vehicle periphery image may be enlarged, and thereby a narrow angle image may be produced by the narrow angle image generation section 44, and may be displayed on the lower region of the display screen 32.

Although a back monitor system 1 including a camera mounted to a rear part of a vehicle is described as the above embodiment, the present invention can be also applied to, for example, a vehicle periphery displaying apparatus including a camera mounted to a front part of a vehicle. Such vehicle periphery displaying apparatus can be used for looking both ways when a vehicle enters an intersection.

While the invention has been described above with reference to various embodiments thereof, it is to be understood that the invention is not limited to the above described embodiments and constructions. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

Further, each or any combination of procedures, processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

What is claimed is:

1. A vehicle periphery displaying apparatus comprising:
    an imaging device configured to capture a vehicle periphery image with a wide horizontal field of view;
    a display device including a display screen, a dimension of the display screen in a vertical direction being larger than that in a horizontal direction; and
    a display controller configured to:
    determine, based on input received from a user, a part of the vehicle periphery image to be presented in detail; produce a predetermined-part image that is an enlarged image of the part of the vehicle periphery image to be presented in detail;
    cause the display device to display the vehicle periphery image and the predetermined-part image on the display screen such that the vehicle periphery image and the predetermined-part image are arranged one above the other in the vertical direction; and
    cause the display device to further display a guide image extending, with a reverse-tapered shape, from the part of the vehicle periphery image toward the predetermined-part image to indicate which part of the vehicle periphery image is enlarged as the predetermined-part image.

2. The vehicle periphery displaying apparatus according to claim 1, wherein:
    the vehicle periphery image includes a right-side part, a center part, and a left-side part; and the part of the vehicle periphery image that is to be the predetermined-part image is user-selectable from the right-side part, the center part and the left-side part.

3. The vehicle periphery displaying apparatus according to claim 1, wherein:
the display controller causes the display device to display the vehicle periphery image on the display screen such that the part of the vehicle periphery image is highlighted in the vehicle periphery image.

4. The vehicle periphery displaying apparatus according to claim 1, wherein:
the display controller causes the display device to further display a deformable mask image that partially masks the predetermined-part image in a manner that varies depending on location of the part of the vehicle periphery image.

5. The vehicle periphery displaying apparatus according to claim 4, wherein:
when the location of the part of the vehicle periphery image is a right-side part of the vehicle periphery image, the mask image partially masks the predetermined-part image such that a dimension of the predetermined-part image in the vertical direction decreases from a right edge of the predetermined-part image toward a left edge of the predetermined-part image; and
when the location of the part of the vehicle periphery image is a left-side part of the vehicle periphery image, the mask image partially masks the predetermined-part image such that the dimension of the predetermined-part image in the vertical direction decreases from the left edge of the predetermined-part image toward the right edge of the predetermined-part image.

6. The vehicle periphery displaying apparatus according to claim 1, wherein:
the display controller performs image processing on the predetermined-part image, thereby producing a processed predetermined-part image.

7. The vehicle periphery displaying apparatus according to claim 6, wherein:
the display controller causes the display device to display a mask image on the display screen so that a shape of the mask image corresponds to a shape of an area where the processed predetermined-part image is absent.

8. A vehicle periphery displaying apparatus comprising:
an imaging device configured to capture a vehicle periphery image with a wide horizontal field of view;
a display device including a display screen, a dimension of the display screen in a vertical direction being larger than that in a horizontal direction; and
a display controller configured to:
determine, based on input received from a user, a part of the vehicle periphery image to be presented in detail;
produce a predetermined-part image, the part of the vehicle periphery image to be presented in detail corresponding to the predetermined-part image;
cause the display device to display the vehicle periphery image and the predetermined-part image on the display screen such that the vehicle periphery image and the predetermined-part image are arranged one above the other in the vertical direction;
cause the display device to further display a guide image extending, with a reverse-tapered shape, from the part of the vehicle periphery image toward the predetermined-part image to indicate which part of the vehicle periphery image is the predetermined-part image, and
cause the display device to further display a deformable mask image that partially masks the predetermined-part image in a manner that varies depending on location of the part of the vehicle periphery image.

9. The vehicle periphery displaying apparatus according to claim 8, wherein:
the vehicle periphery image includes a right-side part, a center part, and a left-side part; and
the part of the vehicle periphery image, the part corresponding to the predetermined-part image, is user-selectable from the right-side part, the center part and the left-side part.

10. The vehicle periphery displaying apparatus according to claim 8, wherein:
the display controller causes the display device to display the vehicle periphery image on the display screen such that the part of the vehicle periphery image is highlighted in the vehicle periphery image.

11. The vehicle periphery displaying apparatus according to claim 8, wherein:
when the location of the part of the vehicle periphery image is a right-side part of the vehicle periphery image, the mask image partially masks the predetermined-part image such that a dimension of the predetermined-part image in the vertical direction decreases from a right edge of the predetermined-part image toward a left edge of the predetermined-part image; and
when the location of the part of the vehicle periphery image is a left-side part of the vehicle periphery image, the mask image partially masks the predetermined-part image such that the dimension of the predetermined-part image in the vertical direction decreases from the left edge of the predetermined-part image toward the right edge of the predetermined-part image.

12. The vehicle periphery displaying apparatus according to claim 8, wherein:
the display controller performs image processing on the predetermined-part image, thereby producing a processed predetermined-part image.

13. The vehicle periphery displaying apparatus according to claim 12, wherein:
the mask image maps an area where the processed predetermined-part image is absent.

14. The vehicle periphery displaying apparatus according to claim 1, wherein:
the vehicle periphery image with a wide horizontal field of view is an image taken from a rear of the vehicle.

15. The vehicle periphery displaying apparatus according to claim 8, wherein:
the vehicle periphery image with a wide horizontal field of view is an image taken from a rear of the vehicle.

16. The vehicle periphery displaying apparatus according to claim 1, wherein:
the vehicle periphery image with a wide horizontal field of view is an image taken from a front of the vehicle.

17. The vehicle periphery displaying apparatus according to claim 8, wherein:
the vehicle periphery image with a wide horizontal field of view is an image taken from a front of the vehicle.

* * * * *